United States Patent [19]

Rinse

[15] 3,673,229
[45] June 27, 1972

[54] METAL OXIDE ACYLATES AND THEIR PREPARATION

[72] Inventor: Jacobus Rinse, 77 Anderson Road, Bernardsville, N.J. 07924

[22] Filed: March 5, 1970

[21] Appl. No.: 16,990

Related U.S. Application Data

[63] Continuation-in-part of Ser. No. 651,120, July 5, 1967, , Continuation-in-part of Ser. No. 840,604, July 7, 1967.

[52] U.S. Cl. .............................260/429 R, 106/14, 106/252, 106/288 G, 106/292, 106/297, 106/302, 106/303, 260/97.5, 260/414, 260/429.2, 260/429.9, 260/431, 260/432, 260/435, 260/438.1, 260/438.5 R, 260/439 R, 260/447, 260/448 R
[51] Int. Cl. ..................C07f 13/00, C07f 11/00, C07f 15/02
[58] Field of Search................260/429.9, 439, 429, 414, 448, 260/438.5, 438.1, 97.5

[56] References Cited

UNITED STATES PATENTS

| | | | |
|---|---|---|---|
| 3,422,125 | 1/1969 | Silver et al. ..............................260/414 |
| 3,296,242 | 1/1967 | Turner et al. ............................260/105 |
| 3,467,683 | 9/1969 | Harson et al. ...........................260/403 |
| 3,461,146 | 8/1969 | Turner et al. ............................260/414 |
| 2,584,041 | 1/1952 | Nowak et al. ............................260/414 |

OTHER PUBLICATIONS

Bradley Progress in Inorganic Chemistry, vol. II (1960) Interscience Publishers, N.Y., N.Y., p. 307, 346

*Primary Examiner*—Tobias E. Levow
*Assistant Examiner*—A. P. Demers
*Attorney*—Littlepage, Quaintance, Wray & Aisenberg

[57] ABSTRACT

Organic metal compounds containing a high percentage of metal and having a central molecular structure comprising two or three metal atoms connected by oxygen bonds to each other, at least one of the metals being trivalent, and, in turn, connected to two or three acyloxy groups or to three divalent-metal acyloxy groups are prepared by reacting metal acetates or formates with metal oxides or hydroxides and with an aliphatic acid having from 7-22 carbon atoms or with a divalent metal acyl oxide of such acid to form products useful as resin additives, fungicides, anti-corrosives and colorants.

4 Claims, No Drawings

METAL OXIDE ACYLATES AND THEIR PREPARATION

This case is a continuation-in-part of application, Ser. No. 651,120, filed July 5, 1967, now U.S. Pat. No. 3,518,287, and application Ser. No. 840,604, filed July 7, 1969.

BACKGROUND OF THE INVENTION

Polyacylated aluminum oxide structures are known which are capable of forming cyclic oligomers, such as the triacylated cyclic aluminum oxide trimers disclosed in U.S. Pat. No. 2,979,497. Products of this character may be prepared, for example, by reacting an aluminum alkoxide with an aliphatic monocarboxylic acid particularly a long chain acid.

The cyclic aluminum acylate oxide trimers have been useful principally as thickeners for resins, oils, asphalt, and the like.

In British Pat. No. 972,804 there are disclosed metal organic compounds containing aluminum, in which the aluminum atom is linked through oxygen to a divalent metal which is in turn connected to a carboxylic acid radical, but in such structures, the remaining aluminum bonds are connected to other aluminum atoms via oxygen atoms, and not to additional divalent metal atoms. Metal organic compounds of this type are obtained by condensing alkoxides or aryloxides of aluminum with acyloxides of divalent metals. The resulting compounds are said to be useful as stabilizers for polyvinyl chloride resins.

Experience has shown the desirability of extending the principle of metal oxide acylates to trivalent metals other than aluminum and of combining such trivalent metals with divalent metals. To accomplish these objectives, it was necessary to devise new and more efficient methods for the preparation of the organic metal compounds.

SUMMARY OF THE INVENTION

In accordance with an important aspect of the present invention there are provided novel organic metal compounds containing a high percentage of metal, and having a central molecular structure comprising three atoms of a trivalent metal, connected by oxygen bonds to each other and by oxygen bonds to (1) three acyl groups or (2) three divalent metal acyloxy groups. In accordance with another aspect of the invention there is provided a novel method for the preparation of the aforementioned organic metal compounds, which is simple and direct, and permits the utilization of low cost raw materials.

For ease of illustration, generally speaking, M is used to represent a trivalent metal, M' to represent a divalent metal, and X to represent an acyloxy radical containing more carbon atoms than an acyloxy radical represented by X'.

A class of novel organic metal compounds according to the invention is that represented by the formula:

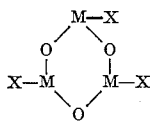

wherein M represents a trivalent metal selected from the group consisting of iron, chromium, bismuth, and cerium, and X is an acyloxy radical derived from a monocarboxylic acid having at least seven carbon atoms, and preferably having at least 10 to 22 carbon atoms.

These compounds may be regarded as cyclic oligomers of trivalent metal oxide acylates, specifically the trimers. Typically these organic metal compounds, and the compounds discussed below, are useful as anti-corrosives and for incorporation with alkyd and other resins in the improvement and coloring of coating compositions. Due to the inherent color of the novel products hereof, they may be considered permanent colorants. The formula for such compounds may be written as $(OMX)_3$.

Another class of novel compounds according to the invention is that represented by the formula:

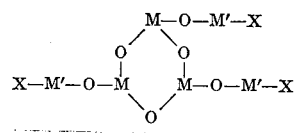

wherein M is a trivalent metal, such as iron, chromium, bismuth, and cerium, X is an acyloxy radical derived from a monocarboxylic acid having, for instance, from seven to 22 carbon atoms, preferably at least 10 carbon atoms, and M' is a divalent metal, such as, for example, zinc, lead, magnesium, calcium, cadmium, copper, nickel, cobalt and manganese.

The formula for such compound may be written $(OMOM'X)_3$.

Still another class of metal-rich organic metal compounds producible by the process hereof may be represented by the formula a. XM'OM(X')OM'X
   b. XM'OM(X)OM'X
   c. XM'OM(OH)OM'X
   d. $M(OM'X)_3$ wherein M, M' and X are the same as defined above and X' is a lower molecular acyloxy radical.

The monocarboxylic acids suitable for preparing the foregoing classes of organic metal compounds of the invention may be of any type including aliphatic, either saturated or unsaturated, aromatic, cycloaliphatic, and heterocyclic acids. The aliphatic acids are preferred, and these may be linear or branched, or with a neo-structure, i.e., one in which the carbon atom in alpha-position to the carboxyl group is a Quaternary carbon atom. Fatty acids, such as stearic, palmitic and oleic acid are suitable, as are also such acids as linoleic and tall acid mixtures. Acids with less than seven carbon atoms are less suitable, because of their volatility. Instead of a single acid, mixtures of two or more acids may be employed.

Regarded from the standpoint of their molecular structure, the new organic metal compounds are derivatives of trivalent metals or trivalent and divalent metals in which each metal atom is connected to another metal atom by an oxygen atom. This group of metal and oxygen atoms serves as the center of the molecule, while acyl groups, one per metal atom, surround the center.

As the formula above clearly demonstrates the compounds hereof contain one, or less, acyl groups per metal atom. This structure differ from that of conventional metal soaps where two or three ligands are attached to each metal atom, i.e., the metals to acyl, or acyloxy ratio is 1:2 or 1:3. Thus the new compounds of the invention are very stable and their properties are quite different from those of metal soaps.

For instance, it will be apparent from the foregoing illustrative formula the organic polyvalent metal compounds hereof typically have a metal to acyl, or acyloxy, ratio of, respectively, 1:1; 2:1; 1:1; 3:2 and 4:3 or at least twice the metal content of metal soaps.

In general, the metal organic compounds of the invention are easily soluble in hydrocarbon solvents to form low viscosity clear solutions. Where fatty acids of at least seven carbon atoms are employed, and depending upon the type of acid, the compounds are oils or soft or hard waxes or resinous products. Certain of the compounds hereof may be likened to fats and oils in which the glyceride radical is replaced by a group of metal and oxygen atoms. By using polyunsaturated fatty acids, the solutions of the products dry in a manner similar to that of a drying oil, to form insoluble coatings of high clarity and gloss. As illustrated above, their metal contents are considerably higher than coating derived from regular metal soaps, and the latter, moreover, do not dry to gloss films.

The metals used determine the color of the products. Thus, aluminum oxide trimers and aluminum-zinc oxide acylates are practically colorless or light brown. Iron derivatives exhibit a deep brown to reddish brown color with many gradations. Chromium derivatives are green, as are copper and nickel oxide acylates, while manganese yields a middle brown shade, and cobalt a violet-blue resin. Cyclic oligomers of iron and chromium have an intense color, probably owing to the presence of three or more trivalent metal atoms in the molecule.

In addition to the uses mentioned previously, the new metal oxide acylates can serve as acid binders (aluminum-zinc compounds), as varnish stains, tinting colors for white paints, wood preservatives, antifouling agents, corrosion inhibitors, leather, waxes, stabilizers, and additives for rubber compounding.

The class of cyclic oligomers of trivalent metal oxide acylates disclosed above is prepared, in accordance with the invention, by a novel method which involves reacting a trivalent metal salt of a lower aliphatic carboxylic acid, such as a formate or an acetate, usually in the presence of a small amount of water, with the equivalent quantity of a monocarboxylic acid which is less volatile than the acid of the trivalent metal salt, at a temperature above about 200° C. until the reaction is complete, and removing volatile lower aliphatic carboxylic acid liberated, under vacuum usually with assistance of a liberating agent such as water, alcohol or the like added in the latter phases of the reaction.

Where aluminum is the trivalent metal, the products thus obtained are identical with those prepared by known methods by reacting an aluminum alkoxide with a fatty acid.

Thus, cyclic trivalent iron oxide acylates may be prepared by substituting one acetate group of basic iron diacetate with an acyl group of at least seven carbon atoms, followed by condensation at 200°–250° C. in vacuum to remove liberated acetic acid. Formates may also be used in this reaction.

Similarly, cyclic trivalent chromium oxide acylates may be prepared by volatilizing one acetate or formate group with steam generated by the water present, with replacement thereof by a less volatile acyl group, and condensing this intermediate product to a cyclic chromium oxide acylate.

The cyclicizing reactions just described are believed to proceed in two steps (a) condensation by formation of oxygen bonds between trivalent metal atoms, and (b) substitution of lower acyl groups, such as formate or acetate groups, by a less volatile acyl group. It is preferable for the condensation to precede the substitution, but this is not always possible owing to the insolubility of the condensed acetate. Therefore, substitution may proceed, whether fully or partially, simultaneously with the condensation.

In some cases, for example using chromium triacetate, substitution precedes and is followed by steam distillation to remove two acetate groups. Subsequent heating to 200° C. causes the condensation to proceed. Thus, the basic acetates of iron and aluminum are particularly suited for this procedure, since they contain only two acyl groups, one to be substituted, and the other to react with the hydroxyl group on another metal atom.

The compounds of the invention in which both trivalent and divalent metals are present may be prepared by a similar reaction whereby a trivalent metal salt of a lower aliphatic carboxylic acid, such as a formate or an acetate, is heated with an oxide or a hydroxide of a divalent metal, in the presence of water, and then the relatively nonvolatile monocarboxylic acid is added to the mixture. Upon distillation, the volatile formic or acetic acid is liberated, and is removed under vacuum with excess water and with the solvent, where a solvent is employed. The vacuum typically is less than about 2 cm. Hg., and the temperature may be of the order of 250° 14 300° C. The formic or acetic acid and solvent may be reused. The reaction proceeds with remarkable facility, and frequently a heat effect may be noticed, indicating that the condensation product of two or more metal atoms has formed a more stable configuration. Thus, hydroxy-metal diacylates of trivalent metals, if exposed to temperatures above 200° C. in vacuum, have been found to condense easily to form cyclic metal oxide acylates.

Also, in some cases, it is possible to use a trivalent metal-hydroxide (e.g., aluminumhydroxide) with a divalent metal-acetate. They condense to the same structures a divalent metal oxides (or hydroxides) with trivalent metal acetates (Examples 7 and 11).

In all the foregoing reactions, the practical upper limit of temperature depends upon the reactants, but is usually about 250°–300° C.

Where a solvent is employed it may be, for example, a hydrocarbon type, such as mineral spirits. Antifoaming agents such as butanol may also be added where needed.

Summarizing, it is seen the present process from a functional basis achieves two effects, namely, greatly increasing the metal to acyl, or acyloxy, ratio and, at the same time, introducing higher molecular acyl groups. Theoretically the less volatile acid can always be induced to replace the more volatile acid but for practical and economic reasons, the organic acid salts of the trivalent metals normally used are the formates or the acetates and the less volatile acid is one containing at least seven carbon atoms. Obviously the substituting acid must contain at least two carbon atoms where formate is used and three carbon atoms where the acetate is used, but preferably contains at least seven carbons for the substitution with radicals derived therefrom are more easily controlled and the resulting organic metal-rich compounds derived therefrom have great commercial interest.

While applicant does not wish to be bound by any theoretical considerations, it does appear the various types of substitution, or condensation and substitution, reactions may be visualized as set out below in representative equations in which M, M', X, and X' have the significance set out before.

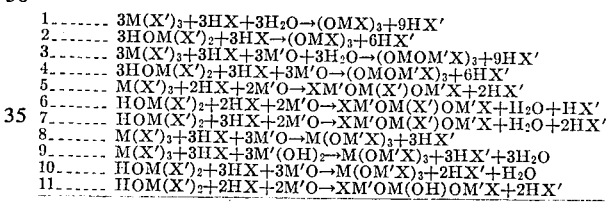

(Equation 9 illustrates the use of a divalent metal hydroxide in place of a divalent metal oxide.)

The foregoing illustrations make it clear that water is not needed in all of the reactions hereof but water usually is present for it acts as a solvent and facilitates the condensation reaction. An excess of water does not hinder the reaction but small quantities normally are used to avoid the necessity of vaporizing off excesses thereof when dry reaction products are desired.

It will be observed, also, from the equations set out above that all divalent metals react in the same manner so that it is not necessary to use a single metal for one can use, for example, mixtures of lead and zinc or nickel and manganese. Likewise more than one trivalent metal may be used provided the appropriate molar ratios of reactants are used to obtain the desired type or types of compound with the desired molecular orientation.

As to the ratio of trivalent, and divalent metals, the foregoing equations illustrate the ratio of divalent metals to trivalent metals (when both are used) is 1:1; 2:1; or 3:1 when compounds of highest purity are desired. Nevertheless, since the principles of the reaction have been established as set out above, it is clear the ratio of divalent metals to trivalent metals may vary anywhere between 1:1 and 3:1.

Among other things, it will be apparent the process hereof enables one to produce organic trivalent-divalent metal acyloxy compounds having a metal to acyloxy ratio of at least 1:1 in which the trivalent metal is connected through an oxygen atom to at least two other di- or trivalent metal acyloxy groups containing at least seven carbon atoms and any remaining valency on the trivalent metal is satisfied with an acyloxy group or an OH group.

The following examples illustrate the practice of the invention, but are not to be regarded as limiting. The formula for the type of compound produced will be set out as in the equations above.

EXAMPLE 1

19.1 grams basic ferric acetate, $HOFe(OOCH_3)_2$, is mixed with 16.2 grams zinc oxide and 20 grams of mineral spirits. After heating for 10 minutes at 100° C., 56 grams tall oil fatty acids is added and water is distilled off. The color darkens gradually. At 150° C. 30 grams mineral spirits is added and the temperature is raised to 200° C., whereupon vacuum is applied. The reaction is completed when boiling ends. The product (84 grams) solidifies at 60° C. and is clearly soluble in mineral spirits. The iron content is 6.64 percent (theory 6.68 percent). Upon addition of 0.5 percent cobalt drier the solution dries in 90 minutes to a clear, high gloss coating.

This compound is representative of the formula $XM'OM(X')OMX$.

EXAMPLE 2

38.2 grams basic ferric acetate is mixed with 40 grams of mineral spirits and heated to 100° C., whereupon 53 grams technical stearic acid is added. Then the temperature is raised to 250° C., finally applying vacuum. The product (67.0 grams, theory 67.2 grams) is a hard, dark brown solid m.p. 90° C., soluble in mineral spirits. When mixed with titanium oxide stearate a highly water repellant shoe polish is obtained.

This compound is representative of the formula $(OMX)_3$.

EXAMPLE 3

The same procedure as in Example 1 is followed but the quantity of tall oil fatty acid is increased to 84 grams and 100 cc butanol is added to avoid foaming. The yield is 106.5 grams (theory 105.6 grams) of a dark brown solid, which dissolves easily in mineral spirits and is usable as a varnish stain for wood.

This compound is representative of the formula $XM'OM(X)OM'X$.

EXAMPLE 4

The same procedure is followed as in Example 1 but using 8.1 grams zinc oxide. Yield 75.4 grams (theory 75.4 grams).

The compound may be represented by the formula $XM'OM(X')X$.

EXAMPLE 5

24.7 grams crystalline chromium triacetate is mixed with 16.2 grams zinc oxide and 80 grams water is added. After heating 30 minutes at 100° C., the color has changed to dark green, 56 grams tall oil fatty acids is added and 45 grams mineral spirits. Vacuum is applied at 220° C. The clear green product dissolves in 40 parts mineral spirits. It dries with 0.5 percent cobalt drier to a high gloss clear coating.

The compound may be represented by the formula $XM'OM(X')OMX$.

EXAMPLE 6

14.8 grams aluminum acetate-formate, $HCOOAl(OH)OOCCH_3$, is heated together with 16.2 grams zinc oxide and 50 grams water. After 5 grams water has been distilled off, 53 grams stearic acid and 30 grams mineral spirits is added. At 180° C. the batch becomes clear. Vacuum is applied at 200° C. Yield 72.0 grams of a hard wax (theory 71.7 grams), which may be used as a rubber compounding additive.

The compound may be represented by the formula

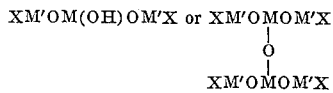

$XM'OM(OH)OM'X$ or $XM'OMOM'X$

EXAMPLE 7

24.5 grams crystalline manganese acetate is heated with 7.8 grams freshly prepared aluminum hydroxide and 60 grams mineral spirits. At 130° C. 28 grams stearic acid is added and at 175° C., 14 grams stearic acid. Also 50 grams hydrocarbon solvent Isopar M. The batch becomes clear at 200° C. and gradually liquifies at 230° C. After cooling to 100° C., 5 grams water is added and temperature raised to 200° C. wit vacuum at the end. Yield 51.7 grams of a dark brown solid wax (theory 50.3 grams) which is soluble in butanol and in mineral spirits.

The compound may be represented by the formula $XM'OM(X)OM'X$.

EXAMPLE 8

22 grams crystalline zinc acetate is heated with 7.8 grams aluminum hydroxide and 5 grams water. At 130° C., 28 grams tall oil fatty acids are added and at 180° C., 14 grams of same. Vacuum is applied and after cooling to 100° C., 10 grams water is added. The batch is heated to 200° C. and distilled off in vacuum to yield 53.5 grams of a clear oil which dries to a clear film after addition of 0.5 cobalt drier.

The compound may be represented by the formula $XM'OM(X)OM'X$.

EXAMPLE 9

The same procedure is followed as in Example 6 but zinc oxide is replaced by 11.6 grams magnesium hydroxide. Yield 69.0 grams of a hard solid melting at 150° C. Theoretic yield 68.5 grams.

The compound may be represented by the formula $XM'OM(OH)OM'X$.

EXAMPLE 10

7.2 grams aluminum acetate-formate is heated with 14 grams isostearic acid and 20 grams mineral spirits to 180° C., and finally to 220° C. under vacuum. The batch becomes liquid. Yield 15.5 grams of a wax-like product, which reacts with organic acids or with water to yield aluminum mono- and di-soaps. It is identical with a product prepared from aluminum isopropoxide, isostearic acid and water.

The compound may be represented by the formula $(OMX)_3$.

EXAMPLE 11

22 grams zinc acetate ($2H_2O$) is heated with 2.6 grams aluminum hydroxide, 5 grams water and 50 grams mineral spirits. 28 grams tall oil fatty acids are added at 130° C. and the batch is distilled off at 220° C., finally applying vacuum. The product yield of 38 grams corresponds with the calculated one of 37 grams for $(TZnO)_3Al$, T being tallate.

EXAMPLE 12

9.5 grams basic iron acetate and 33.5 grams lead oxide are heated with 35 grams water to 100° C. and kept there for 5 – 10 minutes. Then 42 grams isostearic acid is added and distillation continued. Gradually 40 grams mineral spirits is added and temperature raised to 200° C. where vacuum is applied. Here acetic acid is slowly developed and distilled off, leaving 79.4 grams of a dark brown liquid which solidifies at 80° C. Expected yield for $(XPbO)_3Fe$ 81.0 grams.

EXAMPLE 13

24.7 grams chromium acetate is heated with 15 grams butanol and 35 grams water. During distillation there is added 30 grams butanol, 20 grams xylene and 28 grams isostearic acid. When temperature rises to 160° C., 20 grams Isopar M hydrocarbon solvent is added and steam distillation is applied shortly. Finally temperature is raised to 240° C., where acetic acid develops and is removed by vacuum. Yield is 34.9 grams (theory 34.7 grams) of $(OCrX)_n$ cyclic chromium oxide isostearate, which is a solid with melting point above 150° C. and soluble in xylene to a clear, bright, intense green color.

EXAMPLE 14

38 grams ferric acetate is heated with 26 grams neo-heptanoic acid in presence of 30 grams hydrocarbon solvent Isopar M to 240° C. and finally put under 2 cm vacuum until distillation terminates. The dark black liquid solidifies at 190° C. and is soluble in a hydrocarbon-butanol mixture. The yield is 40.5 grams (theory 40.2 grams) for cyclic iron oxide heptanoate. Iron content is 27.7 percent.

EXAMPLE 15

19.1 grams basic ferric diacetate and 29.5 grams methyl linoleate are heated in presence of 10 grams mineral spirits to 240° C. and kept there for 60 minutes until foam formation ends. Vacuum is applied and the residue is a clear brown liquid, yield 55.5 grams (theory 55.1 grams), which dries to a tack-free clear coating upon addition of 0.1 percent cobalt naphthenate. The formula is $(OFeX)_3$.

EXAMPLE 16

10.0 grams chromic acid is dissolved in 12.0 grams acetic acid and 5.0 grams water. Then 13.0 grams zinc dust is added. A reaction proceeds changing the orange yellow into a bright green. Finally 84 grams tall oil fatty acid is added and the batch heated under vacuum until substitution is completed. The solution in mineral spirits may be used as a preservative stain for wood. The formula is TZnOCr(T)OZnT, wherein T is the acyloxy residue of tall oil fatty acid.

EXAMPLE 17

19.7 grams potassium permanganate is dissolved in water, 13 grams zinc dust and 112 grams stearic acid is added and heat applied. The reduction reactions proceeds easily and is followed by condensation and soap formation. The clear brown product, containing sodium stearate, is easily emulsifiable.

EXAMPLE 18

Dissolve 25.5 g of barium acetate in 40 g of water at 100° C, and add 74 g of ethylhexoic acid to the resulting solution before heating same to 200° C. At the latter temperature add 12.6 g of bismuth carbonate and maintain for 30 minutes, whereupon the resulting batch becomes clear. Apply a vacuum and cool to 110° C before adding thereto 9 g of a condensed mixture of titanium tetraisopropoxide with condensed ethylsilicate 1:1. Thereafter heat to 130° C and apply a vacuum to remove liberated alcohols. There is thus obtained 117 g of a viscous clear oil which is useful as a stabilizer for plastics, e.g. vinyls, against heat.

The product of Example 13 is a liquid which is useful as protective coatings for solid substrates, e.g. wood. They are also useful as intermediates for paint driers, stains, catalysts, stabilizers and preservatives. The basic formula is XBaOBi(Y)OBaX in which Y represents residual SiOTi ester.

EXAMPLE 19

Heat a mixture of 84 g of isostearic acid and 12 g of acetic acid to 50° C prior to adding 12.8 g of cadmium oxide and 8.1 g of zinc oxide (ZnO) thereto. Raise the temperature of the resultant to 140° C, at which temperature clarification takes place. Thereafter add 14.8 g of aluminum formoacetate thereto; this also goes into solution at the latter temperature. Raise the temperature to 200° C and add 20 g of water thereto. Then apply a vacuum. The clear liquid which remains solidifies below 100° C. The composition is of the formula XZnOAl(X)OCdX and is a stabilizer for plastics.

EXAMPLE 20

Heat 24.5 g of crystalline manganese acetate with 3.9 g of freshly prepared aluminum hydroxide and 60 g of mineral spirits. At 130° C add thereto 28 g of stearic acid. Add a further 14 g of stearic acid thereto at 175° C. Thereafter add 50 g of hydrocarbon solvent Isopar M. The batch becomes clear at 200° C and gradually liquefies at 230° C. Add 10 g of water and apply a vacuum thereto. The product is a dark brown solid wax soluble in butanol and mineral spirits and of the formula XMnOAl(X)OMnX, wherein X is stearate.

EXAMPLE 21

Dissolve 10 g of chromic acid in 12 g of acetic acid and 5 g of water. Add 13 g of zinc dust to the resulting solution. A reaction proceeds, as is reflected by a color change from orange-yellow to bright green. Add 84 g of tall oil fatty acids to the resultant and heat same to 220° C. While maintaining that temperature, add 15 g of water thereto followed by 5 g of butanol and then apply a vacuum. The product is the compound of the formula XZnOCr(X)OZnX (X is the residue of tall oil fatty acids) which, when dissolved in mineral spirits, is useful as a preservative stain for wood.

EXAMPLE 22

Stir a mixture of 20 g of $CrO_3$, 10 g of water, 25 g of acetic acid and (after reduction with 10 g of butanol) 32.4 g of zinc oxide. Add thereto 119 g of tall oil fatty acids before raising the temperature thereof gradually to 270° C. Water and acetic acid are distilled off. While maintaining the batch at said temperature (at least 60 minutes), add 20 g of water thereto. Then apply a vacuum of 2 inches at the same temperature until distillation ceases (at least 10 minutes). The product is bright green and is soluble in xylene. It is predominantly of the formula $(TZnO)_2CrOCr(OZnT)_2$, but may contain some of the compound of the formula TZnoCr(I)OZnT, wherein T is the residue of tall oil fatty acids. Xylene solutions of the product dry to clear coatings which are useful as wood preservatives and anticorrosives.

EXAMPLE 23

217 g mercuric oxide and 95.5 g basic iron acetate are heated with 30 g acetic acid and 220 g ethylhexoic acid to 120° C until a clear solution is obtained. Then water is dropped in until no more acetic acid is noticeable in the distillate. 200 g mineral spirits is added during the reaction to keep the batch fluid. Vacuum is applied and a soft brown resin is obtained (470g) which may be used as s fungicide and colorant. (Formula XHgFe(X)OHgX).

EXAMPLE 24

The same procedure can be used by replacing iron acetate with 74 g aluminum formoacetate to yield 455 g of a clear light colored resin soluble in xylenes, as recited in Example 23.

EXAMPLE 25

181.6 anhydric copper acetate and 74 g aluminum formic acetate are mixed with 420 g oleic acid and heated to 150° C. After the solution has clarified 50 g butanol is dropped in and temperature is slowly raised to 160° C. Finally 50 g of water is dropped in slowly with 50 g of mineral spirits. Vacuum is applied and the product, a green resin solidifies below 100° C. Yield is 515 g (expected 514.6 g). The formula is XCuOAl(X)OCuX.

EXAMPLE 26

The same procedure as in Example 25 is repeated with 100 g copper hydroxide and 261 g chromiumacetate combining 12.5 percent water. The dark green resin is soluble in xylenes. Yield is 530 g of a dark green resin (expected 524 g). The formula is XCuOCr(X)OCuX. Both products can be used to protect cotton or jute bags against fungis.

In the preceding Examples, the subatmospheric pressure varies between about 2 and 30 mm of Hg, typically 5 mm of Hg. In general, a subatmospheric pressure of 20 mm of Hg and lower are required.

It will be observed from the preceding Examples wherein both di- and trivalent metals are used that a great variety of metals may be used and that condensates, or oligomers, formed are controlled importantly by the valencies and the molar ratios of the two types of metals and the molar proportions of the higher molecular weight monocarboxylic acids.

It has been found that the process may use preformed low molecular aliphatic carboxylic salts or those metals or metal compounds which form such salts in situ in the presence of the low molecular aliphatic monocarboxylic acids typified by acetic acid and formic acid. Thus, the Examples include both types of reactants namely the salts per se or metals, metal oxides, metal hydroxides or metal carbonates or the like, which form salts with acids such as the aforesaid acetic and formic acid which are highly desirable from the standpoint of availability, reactivity and costs. Once the reactants are brought together in the molar ratios desired, it is only necessary to heat the reaction mixture to reacting (condensing) temperatures and pressures which cause both condensing and acyloxy exchange to take place. The extent of the reaction can be determined by the amount of low molecular weight aliphatic carboxylic acid evolved or distilled off and by the yield of products obtained. The completeness of the reaction and the viscosity or melting points of the reaction products is importantly affected by use of liberating agents for the lower molecular aliphatic monocarboxylic acid. Water is a preferred liberating agent although alcohols and certain metal alcoholates or silicon compounds may be used also. The liberating effect of such liberating agents is evidenced by the fact that greater amounts of the low molecular aliphatic monocarboxylic acids are evolved, under any given set of reaction conditions, when they or esters are used than when they are not used. The necessary amount of liberating agent is relatively small and the required amount can be determined empirically by observing no further evolution of the low molecular aliphatic carboxylic or esters even though further quantities of the liberation agents are added.

It will be observed from page 3 of the specification and from the preceding Examples that the preferred divalent-trivalent metal oligomers hereof may be represented by two formulas, namely (a) $M(OM'X)_3$ and (b) $XM'OM(Y)OM'X$, wherein X, M and M' are defined as above and Y is OH, X' or X. A study of the weights of the reactants used in the Examples further illustrates the fact that divalent and trivalent reactants are used in molar ratios of about 3:1 or 2:1 and correspondingly the molar ratio of metal compounds to the high molecular monocarboxylic acids of 7 or more carbon atoms are used in relative molar ratios 1:1 or 3:2 and 4:3.

The general operability of the process is adequately demonstrated by the great variety of groups of elements specifically used in the Examples exemplifying preferred embodiments of the invention which include Zn, Pb, Cd, Cu(II), Mg, Mn(II), Ba and Hg among the divalent elements and Fe, Al, Cr, Bi, Ce Co(III) and Mn(III) among the trivalent metals.

What is claimed is:

1. Organic metal compounds having the formula selected from the group consisting of (a) $M(OM'X)_3$ and (b) $XM'OM(Y)OM'X$, wherein X is an acyloxy derived from monocarboxylic acids of seven to 22 carbon atoms, Y is selected from the group consisting of X, H and acyloxy radicals of acids having one to two carbon atoms, M is a trivalent metal selected from the group consisting of Cr, Mn and Fe and M' is a divalent metal selected from the group consisting of Pb, Zn, Cd, Cu, Mg, Ba, Mn and Hg.

2. Organic metal compounds having the formula selected from the group consisting of (a) $M(OM'X)_3$ and (b) $XM'OM(Y)OM'X$, wherein X is an acyloxy derived from monocarboxylic acids of seven to 22 carbon atoms, Y is selected from the group consisting of X, H and acyloxy radicals of acids having one to two carbon atoms, M is Fe and M' is Zn.

3. Organic metal compounds having the formula selected from the group consisting of (a) $M(OM'X)_3$ and (b) $XM'OM(Y)OM'X$, wherein X is an acyloxy derived from monocarboxylic acids of seven to 22 carbon atoms, Y is selected from the group consisting of X, H and acyloxy radicals of acids having one to two carbon atoms, M is Cr and M' is Cu.

4. Compounds as defined in claim 2 wherein X is derived from talloil acids.

* * * * *